Oct. 27, 1953   W. O. MORAN   2,656,833
GAS HEATER
Filed Oct. 14, 1948   5 Sheets-Sheet 1

WILLIAM O. MORAN
INVENTOR.

BY Beale and Jones
ATTORNEYS

Oct. 27, 1953

W. O. MORAN

2,656,833

GAS HEATER

Filed Oct. 14, 1948

WILLIAM O. MORAN
INVENTOR.

BY Beale and Jones.
ATTORNEYS

Oct. 27, 1953 — W. O. MORAN — 2,656,833
GAS HEATER
Filed Oct. 14, 1948 — 5 Sheets-Sheet 4

WILLIAM O. MORAN
INVENTOR.

BY Beale and Jones
ATTORNEYS

Oct. 27, 1953

W. O. MORAN 2,656,833

GAS HEATER

Filed Oct. 14, 1948

WILLIAM O. MORAN INVENTOR.

BY *Beale and Jones*

ATTORNEYS

Patented Oct. 27, 1953

2,656,833

UNITED STATES PATENT OFFICE 2,656,833

GAS HEATER

William O. Moran, Tulsa, Okla.

Application October 14, 1948, Serial No. 54,451

11 Claims. (Cl. 126—85)

This invention relates to an improved heater which possesses features which enable it to be used for the safe and efficient heating of unattended buildings, vehicles and the like. This invention is a continuation-in-part of my copending application Serial No. 689,231, filed August 8, 1946, which is now abandoned.

While this invention is not limited to use in such structures, it is extremely well adapted for use in the heating of meter houses and other like buildings used in oil refineries, oil production fields, tank farms, and on pipe lines. For instance, it is customary on cross-country pipe lines or on refinery pipe lines which handle either natural gas, or liquid petroleum products, to employ meters, gauges and valves at selected points on the pipe lines. For convenience of observation as well as protection from the elements, it is customary to install a plurality of meters, or gauges, or valves at a given point and house the assembly of such meters, gauges and valves in a meter house. During warm weather conditions, such meters and gauges function in a generally satisfactory manner, but under freezing conditions, it has been found that the meters and gauges fail to record, or give faulty recordings, probably due both to the low temperature itself and to the condensation or freezing of any water carried by the gases or liquids being measured and controlled by the meters, gauges and valves. Attempts have been made in the past to provide satisfactory heaters for such meter houses, but so far as I am aware such attempts have not been successful.

It should be understood that there are certain very distinct problems which must be overcome in order to heat these conventional meter houses in a safe, reliable and satisfactory manner. In the first place, the meter houses are normally not occupied by attendants. They are visited periodically for the purpose of observing and recording meter or gauge readings and making valve adjustments. But such visits are sporadic and of relatively short duration. Consequently, any provision for heating a meter house must embody a type of heater which can function without constant or frequent attendance by an operator. In other words, it must be capable of functioning reliably in an unattended building.

In the second place, the meter houses are very frequently erected in isolated and exposed places where they may be subjected to winds which blow from every direction of the compass and over a large range of wind velocities. A heater for such an exposed meter house must be capable of functioning continually without being influenced by variations in wind directions and velocity, and particularly without being extinguished by sudden changes of direction and wind velocity. In the third place, at oil refineries or tank farms, or on pipe lines, there is always a distinct possibility of leakage of petroleum, particularly the more volatile fractions of petroleum, and the contamination of the atmosphere with vapors of such volatilized petroleum vapors as well as natural gases themselves. At times, the concentration of such vaporized and gaseous products in the atmosphere forms a mixture which is capable of ignition, even explosion, if subjected to a flame or spark. Such conditions not only prevail outside of meter houses but can easily exist within the meter house, due to a pipe leak or faulty valve. A satisfactory heater, to operate under such conditions must, therefore, be one which is itself not influenced by the presence of combustible gases and vapors in the outside atmosphere and at the same time must be incapable of igniting any similar combustible or explosive atmospheres within the meter house.

The improved heater, which is the subject of the present invention, not only satisfies the requirements discussed above but overcomes the disadvantages of all prior art devices of which I am aware. This invention, therefore, has for an object the provision of a heater which will function continually and satisfactorily in unattended structures, such as a meter house. A further object of this invention is the provision of a heater which will burn efficiently and uniformly without regard to prevailing wind direction and velocity and without regard to the presence of combustible gases or vapors in the outside atmosphere. A further object of the invention is a heater which will satisfactorily heat the interior of a structure such as a meter house without danger of causing fire or explosion even if the atmosphere within the meter house contains an appreciable content of combustible or explosive vapors or gases.

Another important object of the invention is the provision of a heater so arranged that the air necessary to support combustion within the heater is drawn from the outside atmosphere, the products of combustion of the heater are discharged into the outside atmosphere but the actual combustion of the fuel occurs within a heater casing at a point which is within the interior of the building or structure to be heated. Still another object of the invention is the provision of a heater which may be easily and cheaply installed within an existing structure and which may be continually used even in the potentially dangerous environment of an oil refinery, tank farm or natural gas installation.

Other objects and advantages of the invention will appear from the following description and the accompanying drawings which illustrate several embodiments of the invention and in which similar reference numbers have been used to designate identical or similar elements.

Figure 1:
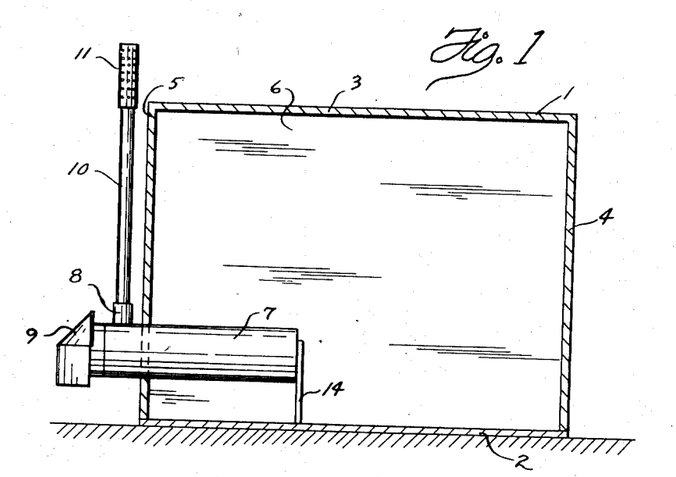
Figure 1 is a longitudinal, sectional elevation of the improved heating unit as installed in a conventional structure.
Figure 2:
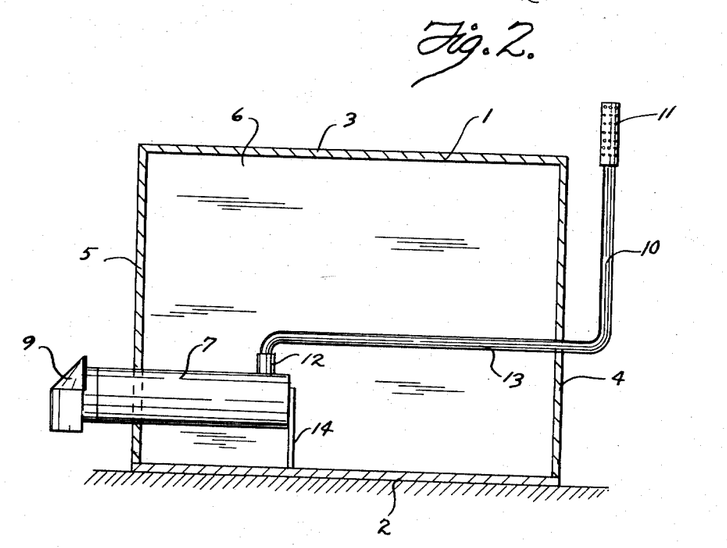
Figure 2 is a longitudinal, sectional elevation of a modification of the improved heating unit adapted for a different mode of installation in a conventional structure.

Referring now to the drawings, and particularly Figures 1 and 2 thereof, Figure 1 shows a structure or enclosure, such as a meter house, generally referred to as 1. The structure may have a floor 2, roof 3, end walls 4 and 5, and side walls and door (not shown). The interior of the structure 6 may, if the structure is a meter house, be provided with one or more panels on which gauges or meters are mounted and may have one or more valves disposed at suitable points within the interior. Through an end wall such as 5, a burner casing 7 is inserted so that a major portion of the casing is within the interior 6 of the structure. Another portion of the casing 7, however, is adapted to remain outside of the structure and is provided with a collar 8 adapted to coact with a flue 10. Mounted on the top of the flue 10 and preferably at a level above the peak of the roof 3, is a flue draft equalizer 11. Mounted on the exterior, or air inlet, extremity of the heater casing 7 is a flame arrestor 9.

Figure 2 more generally shows the same structure but a slightly different modification of heater casing 7 in which the collar 12 is located adjacent the interior end of the heater casing 7 and within the interior 6 of the structure. Collar 12 is adapted for connection with and coaction with a flue extension 13 which, as shown in Figure 2, is generally horizontal and which extends through the opposite end wall 4 of the structure where it is connected with flue 10. In both the modifications of Figures 1 and 2 the heater casing may be provided with one or more supports 14, for supporting the casing on the floor 2 of the structure.

Figures 3, 4:
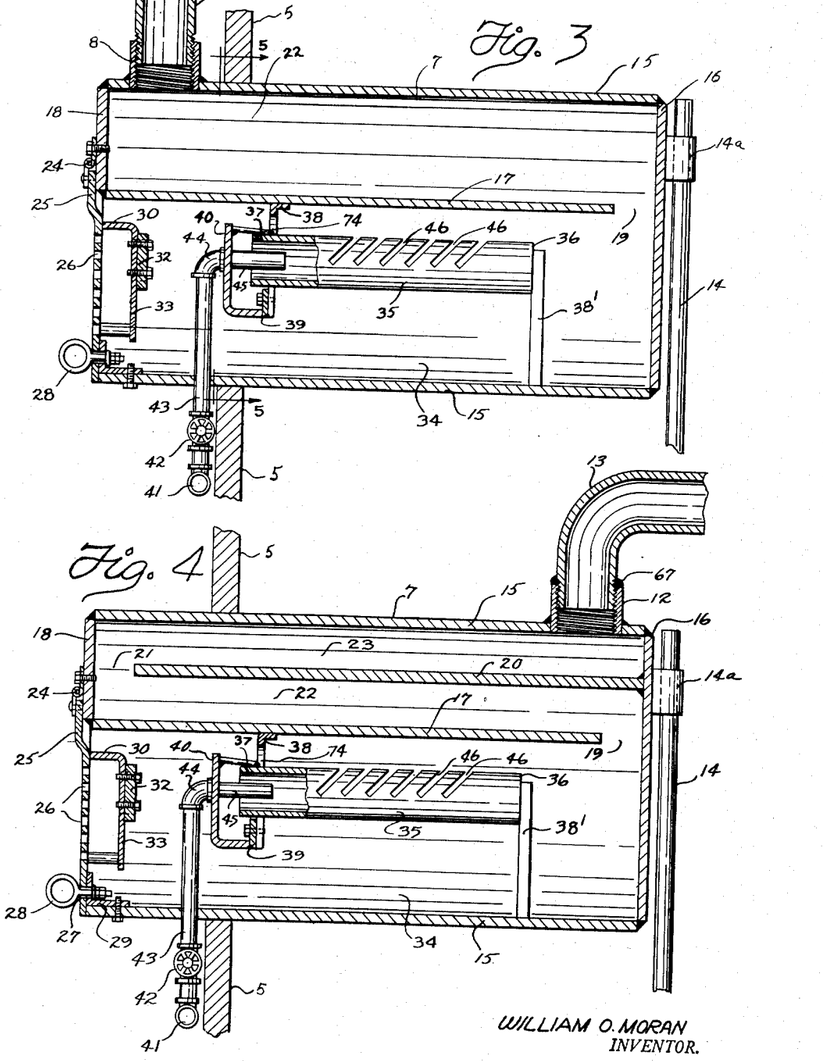
Figure 3 is a side elevational view in cross-section of the heating unit shown more generally in Figure 1.
Figure 4 is a side elevation, cross-sectional view of the heating unit shown more generally in Figure 2.
Figure 5:
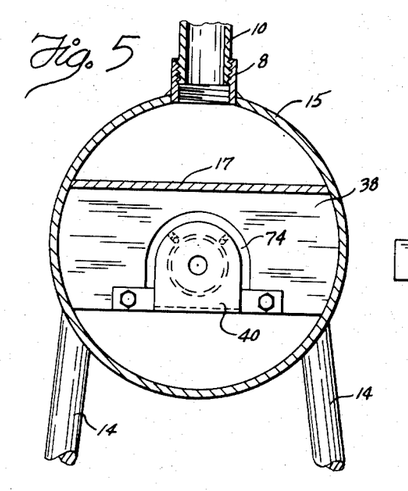
Figure 5 is an end elevation in cross-section taken on the lines 5—5 of Figure 3.

Turning now to Figure 3, the heater casing generally referred to as 7 is formed preferably of a cylindrical shell 15. The interior end of shell 15 is closed by an imperforate plate 16 which may be suitably welded, so as to form a sealed end-closure, to the casing 15. Suitable brackets 14a may be welded or riveted to the end plate 16 for the purpose of holding the legs or supports 14. The exterior end of shell 15 is partially closed off with a plate 18 from which is suspended a door 25. A plurality of orifices 26 are provided in door 25 as air inlet ports. The door being hinged along its upper edges is adapted to be elevated or lowered as desired and when lowered may be latched into place by any suitable latching means. A suitable latching means is provided by slot 27 which is large enough to accommodate ring pin 28 which may be locked to prevent tampering by inserting any suitable padlock (not shown) within the ring. Pin 28 may be mounted on a suitable collar affixed to bracket 29 at an appropriate point within the interior of the cylinder 15. On the interior side of the hinged door 25 is a baffle 30 having a depending skirt 33 adapted to be spaced from the inner edge of door 25 but extensive enough to overlap all of the air inlet ports 24. A suitable orifice 31 may be provided within the skirt 33 and covered with a transparent plate of glass, mica, or heat resistant plastic 32.

Figures 7, 8, 18, 19, 20:
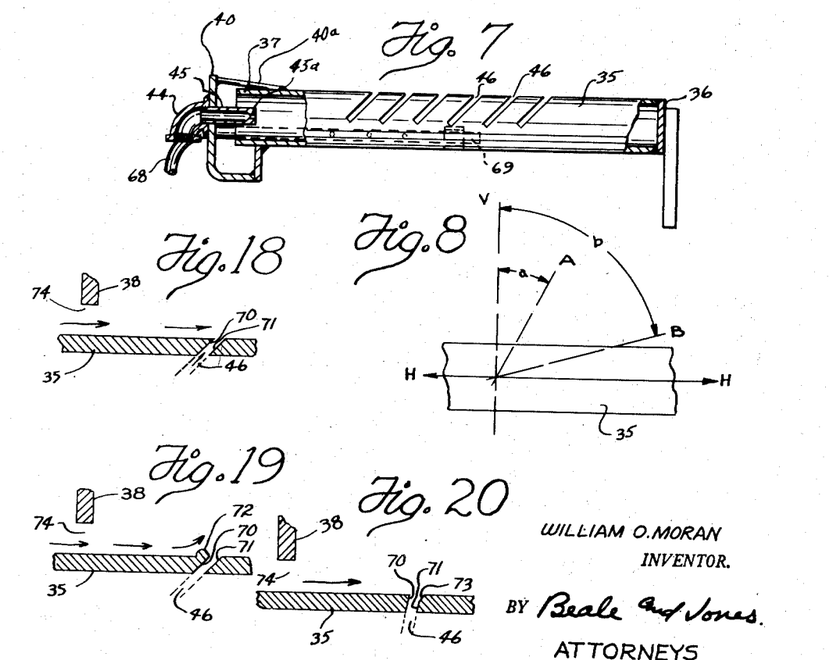
Figure 7 is a side elevational view, partly in cross-section of a burner tube.
Figure 8 is a diagrammatical view based upon Figure 7 but showing a preferred range of variation in the angularity of the burner slots.
Figure 18 is a detailed showing, partly in cross-section and partly diagrammatic, of one of the burner slots, showing the movement of the secondary air with relation to the slot walls.
Figure 19 is very similar to Figure 18 but showing a different modification.
Figure 20 is also similar to Figure 18 but shows a still different modification of a burner slot arrangement.

As stated above, a baffle plate 17 completely divides the interior of cylinder 15 into two zones, an upper or gas passage zone 22 and a lower zone which may be termed the combustion zone 34. Within the combustion zone 34 a burner tube 35 is mounted preferably horizontally, and spaced apart both from baffle plate 17 and the interior walls of cylinder 15. Burner tube 35, which is preferably a cylindrical tube, has its interior end sealed by an imperforate plate 36. Its opposite end 37 is left open for purposes to be described. Desirably, suitable braces or supports 38' may be attached to end plate 36 to provide the desired amount of stability and rigidity for burner tube 35. A baffle plate 38 is affixed to the underside of baffle 17 by welding, riveting or otherwise as may be desired, and depends downwardly and approximately vertically to a point below end 37 of burner tube 35. Baffle plate 38 is suitably notched or indented at 41 so as to conform closely to the outer walls of burner tube 35 but spaced apart therefrom so as to leave an annular air passageway 74 around the exterior of burner tube 35. A suitable plate 39 is welded to baffle plate 40 so as to provide a plate for attaching baffle 40 to the lower part of baffle 38. Two or more brace rods 40a are welded at their ends to the upper part of baffle 40 and adjacent end 37 of burner tube 35 respectively. Plate 39 is also desirably welded to burner tube 35 adjacent end 37. It is preferable to weld elbow 44 to baffle plate 40 so that the parts comprising the assembly of burner tube 35, baffle 38, baffle 40, elbow 44 and fuel nozzle 45 are in fixed, substantially non-adjustable relationship. Baffle 40 is provided with an orifice adapted to receive a burner nozzle 45, which is connected by means of elbow 44 which in turn is connected with a fuel inlet pipe 43, controlled by valve 42, to fuel supply line 41. Burner nozzle 45 has a restricted fuel orifice 45a of appropriate size. The discharge end of burner nozzle 45 is inserted within the open end 37 of burner tube 35 and is substantially coaxial with the horizontal axis of the burner tube 35. The top of burner tube 35 is provided with a plurality of angularly disposed combustion slots 46, which as shown in Figures 3 and 7, depend to a point about midway of the periphery of burner tube 35. Adjacent the exterior end 18 of cylinder 15 a suitable collar 8 is provided as a brace or support for flue 10. Desirably, the interior of collar 8 will be threaded for threaded engagement with corresponding threads on the lower end of flue 10 so as to provide a firm and practically gas-tight connection between collar 8 and flue 10.

Turning now to Figure 4 of the drawings, the cylinder 15 with its associated parts including hinged door 25, baffle 17, burner tube 35 and its associated baffles and fuel supply line is generally similar to the modification shown in Figure 3. As shown in the modification in Figure 3, the exterior end of the cylinder, with the hinged door 25, fuel inlet pipe 43 and the flue 10, is to the left of, that is exterior of, wall 5 of the structure to be heated. In the modification in Figure 4, the hinged door 25 and fuel inlet pipe 43 are both to the left of, that is exterior of, wall 5. However, at the interior end of cylinder 15 adjacent end wall 16, is located collar 12 which except for its position is otherwise similar to collar 8 in the modification of Figure 3. Collar 12 is interiorly threaded for engagement with a flue pipe 13 so as to provide an essentially gas-tight connection with pipe 13. If desired, to insure gas-tightness, a suitable caulking compound 67 may be placed around the entire upper periphery of collar 12 to seal the joint. Since collar 12 and its associated pipe 13 are located to the right of, or interior of, the wall 5, some modification of the interior of the cylinder 15 is desirable. An additional horizontal baffle 20, affixed to end wall 16 by welding or otherwise, and also affixed to the inner wall of cylinder 15, may be disposed above baffle 17. Baffle 20 will extend almost across the entire length of the casing 7 but will leave a gap 21 to provide gas passage. As in the modification shown in Figure 3, the interior of cylinder 15 is separated into a lower or combustion zone 34 but in Figure 4 the upper portion of the interior is divided into two gas passageways 22 and 23.

Figure 6:
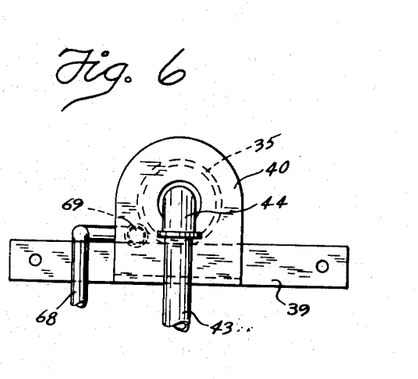
Figure 6 is an end elevational view of the burner unit taken from the air inlet end, i. e. the end at the left as shown in Figures 3 and 4.

As shown in Figures 6 and 7, the main fuel line 43 is supplemented by a pilot fuel line 68 the interior end of which terminates outside of but adjacent burner tube 35. It will be understood that the pilot tube 69 may be perforated and that its supply line 68 may be provided with any suitable valves for controlling the flow of fuel which may be ignited by opening hinged door 25 and by means of which the necessary ignition of the combustible mixture produced in burner tube 35 may be accomplished.

Figures 12, 13:
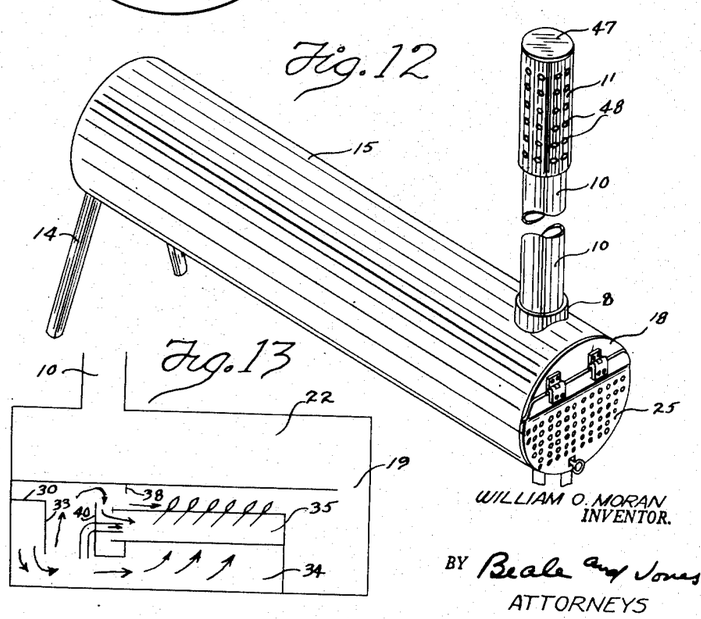
Figure 12 is a perspective exterior view of the heating unit.
Figure 13 is a diagrammatic showing of the path followed by the primary air and secondary air and the relation thereof to the direction of the flames from the burner slots.

The detailed description of diagrammatic Figures 8 and 13 will be covered in the portion of this specification which relates to operation.

Figure 9:
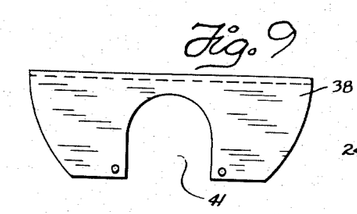
Figure 9 is a detailed view of one of the baffle plates for the burner.
Figure 10:
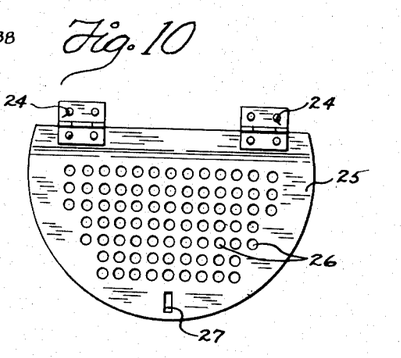
Figure 10 is a detailed front view of the heater door.
Figure 11:
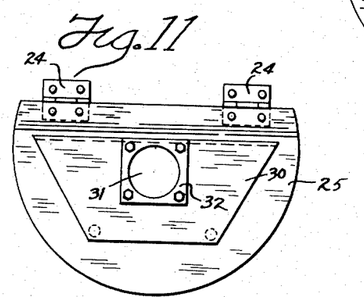
Figure 11 is a detailed rear view of the heater door.

Figure 9 shows a detail of a baffle plate, or collar, which is located within the combustion zone 34 and adjacent the fuel inlet end of burner tube 35. The notch or orifice 41 is sufficiently large to embrace burner tube 35 but to leave an annular air space 74, around the upper periphery of tube 35.

In Figure 12 the upper end of flue 10 is surmounted with a draft equalizing cap 11. This cap has an imperforate top 47 so as to form a generally cylindrical cap which has an inner diameter slightly greater than that of the outer diameter of flue 10, and which may be provided with a suitable lock nut, or any similar device, for holding cap 11 in place at the upper end of flue 10 in fixed adjustment thereon. The vertical walls of cap 11 are pierced with a plurality of orifices or ports 48, preferably in uniformly spaced relationships, and preferably having a combined orifice area approximately equal to the cross-sectional area of flue 10. The arrangement of cap 11 is such that the only exit path for flue gases is from flue 10 through one or more of the ports 48.

The air inlet end of heater 7, that is the end closed by partition 18 and door 25, is preferably connected to a flame arrestor 50 by means of a suitable adjustable collar, not shown. The flame arrestor, illustrated in Figures 14 to 17 consists of a cylindrical portion 50 of a diameter approximating that of heater 7 and adapted to be placed in alignment with the major horizontal axis of heater 7 and to the left of the exterior end as shown in Figures 1 and 2. A hood is mounted on the cylindrical chamber 50 by means of flanges 51 and may be additionally supported by means of braces 52. The hood preferably consists of a vertical closure 53, roughly semi-circular in cross-section and open at the bottom. This vertical closure extends upwardly to a position somewhat above the central horizontal axis of tube 50 and is covered by an inclined roof 54 the upper end of which terminates in a horizontal flange or lip 55. The inner skirt 56 of the vertical wall 53 may not only be bolted or riveted to 51 but may also be connected with an interior baffle 57 which is connected to skirt 56 by means of flange 58. As will be observed from Figure 16, baffle 57 has a peripheral edge spaced apart from wall 53 so as to leave an air passageway between its outer margin and the inner surface of wall 53. Mounted within cylinder 50 are a plurality of screens 59, 60 and 61. Where two adjacent screens are close together they may be separated by an insulating ring gasket, of asbestos or the like, 62. They may be additionally separated by an annular metallic ring or spacer 63. The several screens so insulated or so spaced may be held in position by means of a metallic gasket 64 at various points around the periphery of which may be affixed suitable bolts 65 and nuts 66. It will be observed particularly with relation to Figure 16 of the drawings, that the several screens 59, 60 and 61 are sufficiently smaller than the interior bore of cylinder 50 so as to permit their being installed in spaced relation with respect to the interior walls of cylinder 50, yet they are sufficiently large so as to cover the major annular orifice formed by flange 51. It will also be observed that the interior of the hood formed by walls 53 and roof 54 is open to the atmosphere at two places, an upper inlet port being provided which is under lip 55 and a lower inlet port being provided in the space between wall 53 and baffle 57. It will also be observed that the screens 59, 60 and 61 are mounted so that screens 59 and 60 are closer together than are screens 60 and 61.

As shown in Figure 18, secondary air passes below the lower end of baffle 38 and through the annular air space 74, and thence tends to travel toward the rear end of the combustion zone 34 in the direction shown by the arrows. The fuel admixed with primary air tends to flow out through the slot 46 in the burner tube between the walls of such slot. It is desirable that that portion of the secondary air which travels along the outer surface of combustion tube 35 be made to flow in a direction which is at least horizontal, that is, parallel with combustion tube 35. It is also desirable that as the secondary air approaches and passes over the outlet of a slot 46, it is not diverted downwardly or against the trailing edge 71 of the slot, because if the secondary air is diverted downwardly it tends to oppose the out-flow of the fuel-primary air mixture, thus snuffing out the flame. As shown in Figure 18, the selection of a desired degree of angularity of the slot so that the leading edge 70 is directly opposite and not below trailing edge 71 of the slot, is of importance. If no portion of trailing edge 71 is elevated above leading edge 70, the secondary air will tend to pass over the slot and be deflected upwardly by the flame. If, however, the trailing edge 71 is elevated above the leading edge 70, or if the angularity of the slot is not properly selected, some of the secondary air may be deflected against the trailing edge 71 and will tend to snuff out the flame.

As shown in Figure 19, the desired upward deflection of the secondary air may be increased by placing a bead of metal 72 directly in front of the leading edge 70 of the slot. A similar result may be obtained by a different modification illustrated in Figure 20 in which the upper portion 73 of trailing edge 71 is machined off so that the leading edge 70 of the slot is actually above the trailing edge 71, thus minimizing the opportunity for downward deflection of the secondary air and the snuffing out of the flame.

*Manner of operation*

The operation of the improved heater will be described first with particular reference to the modification illustrated in Figures 1 and 3 of the drawings. It will be understood that the heater has been adapted for use in environments where the presence of hydrocarbon vapors provides a potentially explosive and hazardous condition. It will also be understood that the heater has been adapted for use within structures in which the interior atmosphere may likewise contain hydrocarbon gases or vapors possessing explosive or combustible properties which are inherently dangerous. Moreover, the heater has been adapted for use in isolated structures which are not attended and which may be exposed to wind velocities of widely varying intensity and direction. To cope with these problems all of the component parts of the heater cooperate in such a manner as to permit steady combustion of the fuel within the heater and the maintenance of a set of conditions in the combustion zone which are not influenced by the draft at the head of the flue, or by wind velocity in the air inlet side of the heater. Moreover, they are not modified by undesired fluctuations in the quantities and velocities of the air necessary to supply the primary air and the secondary air for combustion. Lastly, they are not modified by the presence, in the air being used for combustion, of combustible quantities of hydrocarbon gases or vapors. The establishment of the desired fixed conditions within the heater depends upon the arrangement of the burner tube, the arrangement of the slots in the burner tube, the arrangement of the draft cap, the arrangement of the baffles within the heater, the arrangement of the air inlet door and the flame arrestor. Each of the parts discussed above cooperates with the others, to the common end that there is no uncontrolled air turbulence in the combustion zone which will tend to snuff out the burning fuel in the combustion jets.

Air necessary to support combustion enters the flame arrestor either around the edges of baffle 57 or beneath the flange 55 and thence passes successively through the screens 59, 60 and 61. These screens are preferably fine mesh wire screens. A suitable mesh which I have employed is 70 by 100, although a screen possessing uniform 100 mesh is equally satisfactory and under certain conditions I may employ screens having an even finer mesh than 100 mesh screen. It is most desirable that the flame arrestor be provided with at least two screens such as 59 and 61 so as to provide a plurality of screens, insulated from each other and separated from each other by an air space of appreciable width. I have found it preferable to employ at least three screens and to separate two of the screens such as 59 and 60 by a smaller distance than the distance which separates 60 and 61. I preferably employ a plurality of screens because if a single screen were used it is quite possible for it to become damaged or ruptured by faulty installation. It is also possible for the screen to become corroded and eventually eaten away in use, it being remembered that many of the petroleum products, both liquid and gaseous, in refineries contain high percentages of sulphur and other acid-forming compounds. A new or undamaged screen will present an effective flame barrier but a corroded or broken screen will permit the passage of flame through any break. Consequently, I prefer to employ a plurality of screens so arranged that if one fails, the remainder will function in the intended manner.

Figures 14, 15, 16, 17:
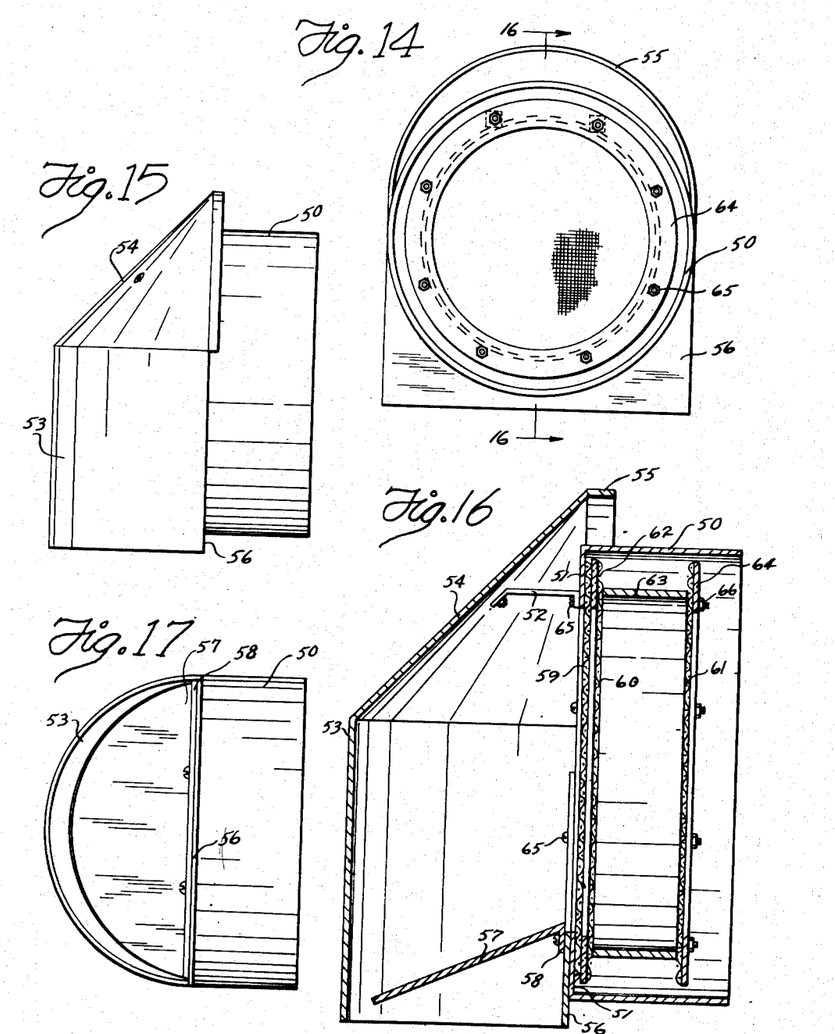
Figure 14 is an end elevation of a flame arrestor adapted to be inserted at the air inlet end of the heating unit.
Figure 15 is a side elevational view of the flame arrestor shown in Figure 14.
Figure 16 is a side elevation in cross-section taken along the lines 16—16 of Figure 14.
Figure 17 is a bottom plan view of the flame arrestor.

In refinery locations, or gas fields, or petroleum fields, the atmosphere very frequently contains appreciable amounts of combustible hydrocarbon vapors. Gasoline leaking from a tank or pipe line readily vaporizes but the vapors being heavier than air generally cling to the ground and flow by gravity along the ground surface. Any combustible gases from a source such as above may, if introduced into my burner, be ignited and cause a flash-back or puff-back. It has been observed that when such a condition occurs flame appears at the air inlet side, that is, outside of door 25. With the flame arrestor illustrated in Figures 14 to 17 installed on the air inlet side of door 25, such flame will exist within the connecting collar. If the concentration of combustible gases is high enough and if the quantity of such gases is large enough the flame within the aforesaid space may burn sufficiently long to consume all oxygen in the air and starve the flames from burner tube 35. If this situation occurs, and all flames from burner tube 35 are extinguished, gas continues to flow through the burner, but of course, the burner itself ceases to function as a heating unit. Under such circumstances, unconsumed gas will be discharged from flue 10 and will not be permitted to be discharged within the structure to be heated. It has been my observation that where combustible gases or vapors exist in the outside atmosphere they exist in greatest concentrations along the actual ground surface and they occur in fluctuating amounts. The flame arrestor cover has been deliberately provided with a lower air port and an upper air port, being the spaces between baffle plate 57 and the vertical wall 53, and the space immediately below flange 55, respectively. These two air access passageways are spaced apart vertically by an appreciable distance. Consequently, if any relatively dense gasoline vapors approach the lower edges of vertical walls 53 they may, insofar as permitted by baffle 57, enter the lower part of the protective hood and flow toward the burner itself creating the possibility of a puff-back as described above. However, the provision of the upper air inlet passageway below flange 55 permits relatively pure air to enter through that passageway and flow thence toward the burner and combustion zone 34, greatly minimizing the chances of any flame, caused by a puff-back, from consuming all of the oxygen and extinguishing the flames from jet 46. It will be understood that baffle 57 may be disposed substantially horizontally or inclined downwardly, as shown in Figure 16, and in general will be formed of a metal of such gauge as will permit deflection and adjustment thereof as desired. The disposition of the baffle 57 is such as will ordinarily prevent the passage upward of relatively dense gasoline vapors except if they are aspirated by air being drawn in around the edges of the baffle. Under such circumstances, the gasoline vapors will be diluted by the air and conditions will be created which will further minimize the opportunity for complete combustion of all available oxygen since such diluting air will increase the air added below flange 55. The arrangement is such that only in the rare event that a stratum of combustible vapors, such as gasoline vapors, is of sufficient depth to submerge the entire covering of the flame arrestor will there exist an overall condition which will support a flame between screen 61 and air inlet door 25 which will consume all oxygen and cause the extinguishment of the flames from slots 46. Even under such conditions of extreme concentration of combustible vapors the propagation of the flame from the burner to the outside atmosphere is prevented by screens 59, 60 and 61.

After the air has passed through the flame arrestor, it enters thte various ports 26 in door 25 and is deflected downwardly by skirt 33 of baffle 39. Some of the air follows a path upwardly over the top of baffle 40 and into the space between baffles 40 and 38. A minor fraction of this air is aspirated and passes downwardly and into the open end 37 of combustion tube 35 where it meets fuel being discharged from jet 45a of tip 45. This air is the primary air which upon mixing with the fuel passes into the interior of burner tube 35 thence through the burner slots 46 where it is burned. The major portion of the air present in the space between baffles 40 and 38 passes through the slot 74 and thence in a direction initially generally parallel to the major axis of burner tube 35. The volume of air so passing in this direction is generally sufficient to supply the secondary air for complete combustion of the fuel. Air which does not pass upwardly into the space between baffles 38 and 40 tends to flow below said baffles and into combustion zone 34 below burner tube 35. As the result of the combustion of the fuel and primary and secondary air, sufficient heat is developed in the space between burner tube 35 and baffle 17 to expand the hot products of combustion in that space and to create a gas zone which is relatively less dense than the gas zone below burner tube 35. Consequently, any air not needed for primary air or secondary air for combustion and which is passing through combustion chamber 34 below burner tube 35 will generally be cooler and more dense, and will not tend to rise above burner tube 35. If, however, there is insufficient air for complete combustion in the area above burner tube 35 and below baffle 17, some of the air from the space below may be drawn upwardly so as to supply additional secondary air. As they pass to the rear of combustion zone 34, in a direction toward end 16 of tube 7, the hot products of combustion and excess air become admixed, more equalized in temperature but without any undue turbulence. The mixture of such gases then flows upwardly through passageway 19, reverses its direction of flow and flows through zone 22 to the foot of flue 10.

The draft equalizer cap 11 which is adjustably mounted at the upper end of flue 10 is, as stated above, provided with a plurality of orifices 48 which are spaced in a plurality of rows around the entire periphery of the vertical walls of cap 11. The top of cap 11 is sealed off with an imperforate plate 47 so that any flue gases discharged from flue 10 must pass through orifices 48 in order to get into the outside atmosphere. Preferably the combined area of the orifices 48 is about the same as the cross-sectional area of flue 10. Consequently, where the outside wind velocity is zero, combustion gases which are rising through flue 10 may pass out of the ports 48 as readily and at substantially the same velocity as they are rising within flue 10. However, where wind is blowing from a given direction at a velocity other than zero, the ports 48 on the windward side of cap 11 are subjected to somewhat higher outside air pressure than the ports on the opposite side of cap 11, that is, the leeward side. In fact, the ports on the leeward side are generally subjected to atmospheric pressure which is below that of the surrounding atmosphere. In other words, on the windward side there is a high pressure area, on the leeward side there is a low pressure area. When the windward or high pressure area is subjected to wind velocity which creates a pressure less than the stack pressure in flue 10, flue gases may pass out through all ports in cap 11. When wind velocity is such as to create a windward or high pressure which equals the stack pressure, ports 48 on the windward side of cap 11 are in effect sealed off. However, the reduced pressure on the leeward side of cap 11 is sufficiently below the stack pressure to permit flue gases to escape through the leeward ports rapidly enough to remove combustion gases at the normal rate of generation. When the wind velocity is great enough to create a windward side high pressure on cap 11 which exceeds the stack pressure, air is permitted to enter cap 11 through the windward ports. This tends to create a greater pressure within the interior of cap 11 but the tendency is balanced by the corresponding reduction of pressure on the leeward ports to which permits the flue gases and added air to be discharged through said leeward ports more rapidly than when under the influence of mere stack pressure. A conventional flue such as 10 which is not surmounted by a draft equalizer would permit wind from any direction to force the draft at the upper end of flue 10 and would tend to withdraw combustion gases more rapidly than they would normally be formed within the heater. This, in turn, would increase the demand for air necessary to support combustion and would seriously modify the combustion conditions within zone 34. By installing the draft equalizer cap at the top of flue 10, increased external pressure of wind velocity, regardless of the direction of the wind, does not cause a sudden or violently increased draft or seriously modify the combustion conditions within zone 34.

Zone 34 is, therefore, maintained at all times under the optimum conditions of combustion for which it was designed. Furthermore, by virtue of the perforations in the door 25, supplemented by the baffle 30 and the baffles 38 and 40, regardless of the direction of the wind, or of its velocity, the flow of air through the ports 26 in door 25 is maintained constant. No sudden gusts of air are permitted to occur within combustion zone 34 and the air which is introduced through door 25 is separated into the primary and secondary air streams, and the excess air stream, which flows quietly below burner tube 35. It will be observed, therefore, that at both the air inlet end and at the flue gas exit end there have been provided elements which eliminate excessive drafts and which throttle the air inlet flow and the combustion outlet flow at both ends of the heater.

A further important feature of the installation is the relatively fixed and non-adjustable arrangement of baffles 40 and 38 with relation to burner tube 35 and particularly the open end 37 thereof. Baffles 40 and 38 are spaced apart from each other by a fixed distance which is sufficient to permit a controlled flow of air over baffle 40 and under baffle 38 so as to supply the air necessary as secondary air for combustion, yet at the same time permitting the withdrawal of a small part of this air into the interior of burner tube 35 for the necessary primary air. The fixed relationship of baffles 40 and 38 is important because since the combustion conditions in combustion zone 34 are stabilized by means of inlet door 25 and draft equalizer 11, no adjustment of air or fuel flow is necessary. Thus, adjustment by inexperienced personnel in the field is unnecessary and avoided. In fact, to eliminate field adjustment baffle 40 is deliberately welded to combustion tube 35 and to supports 40a so as to insure against attempts to make adjustments in the field. Furthermore, the fuel inlet tube 45 having been initially selected with regard to a fuel inlet orifice 45a to give a proper fuel supply, is deliberately threaded into elbow 44 which is in turn welded to baffle 40 so as to prevent undesired adjustment and replacement of fuel nozzle 45. From the foregoing, it will be seen that the location of burner tube 35 in combustion zone 34 is selected with regard to a position which will minimize turbulence within combustion zone 34; moreover, baffles 38 and 40 are so placed and so proportioned as to provide for the passage of the necessary primary air and secondary air to support combustion of a selected fuel, as introduced into the interior of burner tube 35 in controlled and required amounts, yet at the same time the air necessary for primary air and secondary air for combustion is baffled to minimize turbulence within combustion zone 34. Particular attention is called to the annular space 74 and to the partial clearance formed between the outer (relatively smaller) marginal outline of baffle 40 as compared with the inner (relatively larger) marginal outline of baffle 38.

The arrangement of the burner slots in the tube 35 is a feature of considerable importance. A combustion tube having a length of about 18 inches and an external diameter of about 1¼ inches, and an internal diameter of about 1 inch, and in which ten burner slots are spaced about an inch apart, has been found to give excellent results. Such slots which have a width of about 1/16th of an inch and which extend from the top of burner tube 35 to a point about opposite the major horizontal axis of the tube may desirably be disposed at an angle of about 45° from the vertical. Under such circumstances the relationship between the leading edge 70 and the trailing edge 71 of each burner slot, as illustrated in Figure 18 of the drawings, exists so that secondary air flowing along the surface of burner tube 35 is not deflected downwardly and into the burner slot so as to snuff out the flame. The burner slots, however, do not have to be installed at an angle of about 45° from the horizontal, in fact, I have found that if the slots are arranged at any angle from the horizontal between about 15° and about 85°, a flame is produced which will burn constantly and without danger of being snuffed out by secondary air currents. I have tried slots which are placed at an angle of 90° from the horizontal and in lieu of slots, I have also tried orifices disposed at a variety of angles. With vertical slots and with the orifices there is a constant danger of the flame being snuffed out by secondary air. In fact, if the slots are installed within the uppermost limits of the 15° to 85° range, mentioned above, I find it desirable to modify the slots either as shown in Figure 19 or 20 to safeguard against any downward deflection of the secondary air and snuffing out the flame. As shown in Figure 19, one arrangement for avoiding downward deflection is the placing of a bead or small baffle immediately in front of the leading edge 70 of each slot, or alternatively, as shown in Figure 20, by machining-off of the upper portion of trailing edge 71 of the slot. Obviously, a combination of these two modifications could be employed, that is, by using both a bead 72 in front of the leading edge of the slot and machining-off a portion 73 of the trailing edge of the slot. In fact, by utilizing a bead or barrier 72 on the leading edge of the slot, or by utilizing the machined-off margin of the trailing edge 73 of the slot, or preferably by utilizing both of said features, the slots may be disposed in the tube 35 at angles greater than 85° and even up to 90° from the horizontal. It will be understood that while I have referred to adding a bead or machining-off, other methods of accomplishing these results may be employed, as for example casting the tube with slots of desired angularity and edge formation.

The location and disposition of the baffle 17 is of importance. Being located just above the flames from the several combustion slots, baffle 17 is heated not only by radiant heat, convective heat, and heat conducted by hot products of combustion but, in fact, is heated by direct impingement of the flame. Baffle 17, therefore serves to heat further the combustion gases which have left combustion zone 34 and have entered zone 22 so that these gases in turn can give up their heat to the walls 15 of heater 7. Additionally, since baffle 17 is in direct contact at its fixed end, and on both sides, with the walls 15 of heater 7, the baffle conducts heat to walls 15 so that heater 7 becomes more effective in transmitting heat to the space being heated.

I prefer the modification illustrated in Figures 1 and 3 of the drawings because that modification accomplishes the primary objectives which are, the utilization of a heater which may be readily inserted into a given wall of an existing structure without requiring more than a single opening in the wall. The same, of course, applies to an installation of this modification of the heater at the time of erection of a given structure. Additionally, this modification of the heater has the advantage of an arrangement which permits direct access to the heater from the outside of the structure for ignition of the pilot light and for any cleaning or repairs which may be necessary after prolonged used. Fundamentally, however, this modification of the heater possesses the virtue of having an air ingress door and a combustion gas flue which are both entirely outside of the structure being heated and both at the same end or side of the structure, yet the actual combustion within the heater takes place in a space which is physically within the structure being heated, but the heater is entirely air-tight so that no open flame may create the danger of explosions or combustion within the structure. Consequently, practically all of the desired heat given off by the heater is imparted to the interior of the structure in a safe, simple and reliable manner. However, it may occasionally be desirable to heat a particular set of valves, or meters, or some other object within the structure, at interior points which are somewhat remote from the actual heater. Under such circumstances, it is not necessary to limit the arrangement of my device to the modification shown in Figures 1 and 3 of the drawings. The alternative arrangement shown in Figures 2 and 4 may be utilized where it is desired to install the air ingress door and the heater itself through one wall while permitting the flue gases to pass through an opposite wall or even an adjacent wall while heating remote valves or meters. To permit such a modification of use, the cylinder 15 of the heater may be modified to the extent necessary to change the position of collar 8 to the opposite end of the cylinder as shown at 12 in Figure 4. A suitable connection 13 may be inserted into collar 12, preferably by threaded engagement, and to insure against any combustion gas leakage it may be desirable to seal the joint between collar 12 and extension 13 by welding or by caulking with a suitable compound as at 67. In such a modification extension 13 may be directed to the opposite wall of the structure or may be provided with a right angle bend so as to take it out of an adjacent wall of the structure at any selected point. Extension 13 may be integral with flue 19 or may be formed by jointed connections. It may also be desired, in order to provide for the proper discharge of flue gases from the burner as shown in Figure 4, to install an additional baffle 20 above and generally parallel to the primary baffle 17. This, of course, will create an additional combustion gas exit zone 23. In order to prevent undesired obstruction to the free flow of the combustion gases through zones 22 and 23, it may be desirable to make casing 15 of a somewhat larger cross-sectional size than would be required for the modification shown in Figure 3. For example, where cylinder 15 of Figure 3 may desirably have an 8 inch diameter, cylinder 15 of Figure 14 may desirably have a 10 inch diameter.

Furthermore, under some circumstances it may be desirable to modify the embodiment shown in Figure 3 so as to permit installation through one wall of a given structure and discharge of the combustion gases through an opposite wall by merely extending cylinder 15 entirely through the structure so that the air ingress end would be position as shown in Figure 3 yet the flue gas discharge end would be as shown in Figure 4. This modification as well as the modification in Figure 4 both have the virtue of withdrawing air for combustion from the outside of the structure and discharging the combustion gases outside of the structure.

In the foregoing specification, reference has been made to fuel for the burner without expressly describing the fuel. Conventional fuel gas has been found to be a satisfactory fuel, particularly in the vicinity of refineries where there is a large source of either manufactured gas or natural gas. However, I do not wish to be limited to those specific types of fuel. In general, any fuel which may be vaporized, and when vaporized will form a combustible mixture, may be used in my heater. Thus, not only natural gas, refinery gas, or manufactured gas, but also the so-called bottled gases, such as propane, butane and mixtures of the relatively light, normally gaseous hydrocarbons which are available as fuels, may be used. With natural gas, or manufactured gas, the conventional gas pressure of 2 to 6 ounces per square inch gauge may be employed. By the selection of a fuel jet 45 with an orifice 45a of a selected size, the so-called bottled gases which are commercially obtainable in cylinders compressed to much higher pressures may be used by installing a suitable pressure reduction valve in line 43 and by using a somewhat smaller orifice 45a than is ordinarily used for low pressure gas. With such alternate fuels, no other change in the arrangements of baffles, burner tube, or burner tube slots is necessary, so the burner is adaptable to a wide variety of available fuels.

In this specification I have illustrated the use of my burner in heating meter houses and the like. Such use was by way of illustration only. It is contemplated that the burner may be used to heat other structures such as warehouses, work sheds, garages, military barracks and the like. Moreover, the heater is not limited to use in heating fixed structures, but may readily be used in heating vehicles, such as troop transport trucks and the like. In heating vehicles the so-called bottled gas fuels would be readily usable. The same advantages which flow from the use of my burner in connection with isolated and unattended structures subjected to high wind velocities in exposed places would also be apparent in moving vehicles since one of the important virtues of my heater is its ability to function safely and reliably without regard to wind direction and velocity, under conditions which are frequently found in vehicles moving even at high speeds.

I claim:

1. In a gas heater for heating an enclosure having at least one vertical wall, said heater being adapted to withdraw air for combustion from the outside atmosphere and to discharge flue gases into the outside atmosphere while heating the interior of the enclosure, a laterally closed casing adapted to be partially inserted through the wall of said enclosure, a perforated air inlet door at the end of said casing adapted to be positioned exterior of said wall, a flue gas discharge conduit connected with said casing to discharge flue gases exterior of said enclosure, a burner tube within said casing at a point in spaced relation to and interior of said air inlet door, means to stabilize the rate of air flow into said casing, the rate of flue gas discharge from said casing and the flow of primary and secondary air to said burner tube, said stabilizing means comprising parallel vertical baffles extending generally transverse to said burner tube and disposed in spaced, predetermined relationship between said air inlet door and said burner tube.

2. A gas heater of the character described in claim 1 including an elongated horizontal baffle positioned in spaced relation above said burner tube and said door and attached to the interior of said casing along each side and at its end at the door end of said casing but in spaced relation from said casing at its end opposite said door end, whereby said secondary air passes between the upper portion of said burner tube and underneath of said horizontal baffle, said flue gas discharge conduit being connected to the upper portion of said casing above said baffle and at the door end of said casing, and means for supplying gaseous fuel to the interior of said burner tube, said burner tube being open at its end adjacent said air inlet door and being closed at its opposite end and having a plurality of parallel combustion slots, said slots being disposed in the upper half thereof, said slots being disposed at an angle of between about 15° and about 85° from the horizontal axis of the tube and extending upward and toward the casing end opposite said door end whereby gases of combustion from said burner tube slots pass underneath said horizontal baffle toward the end of the casing opposite the door end thereof and thence upward in said casing at the end of said baffle and through the casing to said flue gas discharge conduit connected to said casing.

3. A gas heater of the character described in claim 1 including an elongated horizontal baffle positioned in spaced relation above said burner tube and said door and attached to the interior of said casing along each side and at its end at the door end of said casing but in spaced relation from said casing at its end opposite said door end, whereby said secondary air passes between the upper portion of said burner tube and underneath of said horizontal baffle, said flue gas discharge conduit being connected to the upper portion of said casing above said baffle and at the door end of said casing and means for supplying gaseous fuel to the interior of said burner tube, said burner tube being open at its end adjacent said air inlet door and being closed at its opposite end and having a plurality of parallel combustion slots disposed transversely in the upper half of said tube, said slots each having its edge adjacent said open end of said tube elevated above its opposite edge so as to prevent downward deflection of said secondary air passing over the top of said burner tube and underneath said horizontal baffle as it passes over the tube from its open end toward its closed end, said slots also being disposed at an angle of between about 15° and about 90° from the horizontal axis of the tube as measured upward from the horizontal axis of the burner at its end at the closed end of the burner tube.

4. A gas heater of the character described in claim 1 including a first elongated horizontal baffle positioned in spaced relation above said burner tube and said door and attached to the interior of said casing but in spaced relation from said casing at its end opposite said door end, whereby said secondary air passes between the upper portion of said burner tube and underneath of said first horizontal baffle and a second horizontal baffle positioned in spaced relation above said first horizontal baffle and attached to the interior of said casing along each side and at its end opposite to said door but in spaced relation from said casing at the door end thereof, said flue gas discharge conduit being connected to the upper portion of said casing above said second baffle end at the opposite to the door end of the casing.

5. A fluid fuel heater adapted for heating a walled enclosure, said heater comprising a casing having an air-inlet end partially open for communication with the atmosphere and having its opposite end closed, said casing being adapted for partial insertion through a wall of said enclosure with the air inlet end thereof being exterior of the enclosure, a fluid fuel burner tube within said casing, a fluid fuel duct adapted to lead fluid fuel to said burner tube for combustion thereby, parallel vertically disposed baffles disposed adjacent said burner tube transverse thereto and intermediate said open air inlet end of the casing and said burner tube and adapted to stabilize air introducted through said air inlet casing end and produce a stabilized flow of combustion gases generated by the combustion of said fluid fuel, a combustion gas outlet in said casing, and at least one additional baffle within said casing disposed between said burner and said outlet adapted to direct the flow of combustion gases from said burner tube through said casing and to said outlet.

6. The heater defined in claim 5 wherein said combustion gas outlet is disposed adjacent said air inlet end of said casing and in the portion of said casing which is adapted to be disposed exterior of said enclosure.

7. The heater in claim 6 wherein said casing is a horizontally disposed elongated cylinder and wherein said burner tube is slotted and is disposed substantially parallel to the horizontal axis of said cylinder.

8. The heater defined in claim 7 wherein the slots in said burner tube are positioned adjacent the top surface of said burner tube, are parallel to each other, and are disposed at an angle of between about 15° and about 85° as measured from a horizontal plane parallel to the said axis of said cylinder.

9. The heater defined in claim 8 wherein that edge of each burner slot, which is nearest the air inlet end of said casing is elevated above the corresponding portion of that edge of said burner slot which is more remote from said air inlet end of said casing.

10. In a fluid fuel heater comprising means forming a combustion chamber one end of which has an air inlet opening and the other end of which has a combustion gas discharge opening adjacent thereto, a fluid fuel burner tube disposed entirely within and in spaced relation to said combustion chamber, said burner tube being closed at the end thereof adjacent the discharge opening of said combustion chamber, the other end of said burner tube, which is relatively adjacent but spaced inwardly from said air inlet end of said combustion chamber, being provided with an opening adapted to permit the introduction of primary air and fluid fuel for admixture within said burner tube, means for supplying fluid fuel to within said burner tube, said burner tube having on the upper portion thereof a plurality of parallel combustion slots, said slots being disposed at an angle of between about 15° and about 85° from the major axis of said tube and being inclined upwardly in the direction of the closed end thereof, and spaced substantially vertical baffles disposed adjacent the air inlet end of said combustion chamber and the air inlet end of said burner tube for controlling the flow of primary air to the interior of said burner tube while permitting and controlling the passage of secondary air adjacent and exterior of said burner slots.

11. The heater defined in claim 10 wherein those edges of said slots, which are relatively adjacent the primary air inlet end of said burner tube, are elevated above the opposing edges, of said slots, which are relatively adjacent the closed end of said tube.

WILLIAM O. MORAN.

References Cited in the file of this patent

UNITED STATES PATENTS

| Number | Name | Date |
|---|---|---|
| 939,925 | Schellhammer | Nov. 9, 1909 |
| 975,868 | Ishii | Nov. 15, 1910 |
| 1,162,205 | Ashorn | Nov. 30, 1915 |
| 1,811,323 | Lejay | June 23, 1931 |
| 1,839,655 | Dobbins | Jan. 5, 1932 |
| 1,842,625 | O'Riley | June 26, 1932 |
| 2,158,643 | Wacek | May 16, 1939 |
| 2,192,920 | Linch | Mar. 12, 1940 |
| 2,400,117 | Holthouse | May 14, 1946 |
| 2,420,599 | Jurs | May 13, 1947 |

FOREIGN PATENTS

| Number | Country | Date |
|---|---|---|
| 27,807 | Great Britain | of 1913 |
| 354,153 | Great Britain | Aug. 6, 1931 |